April 1, 1924.                                    1,488,631
J. BERGE
HUB ODOMETER
Filed April 14, 1919
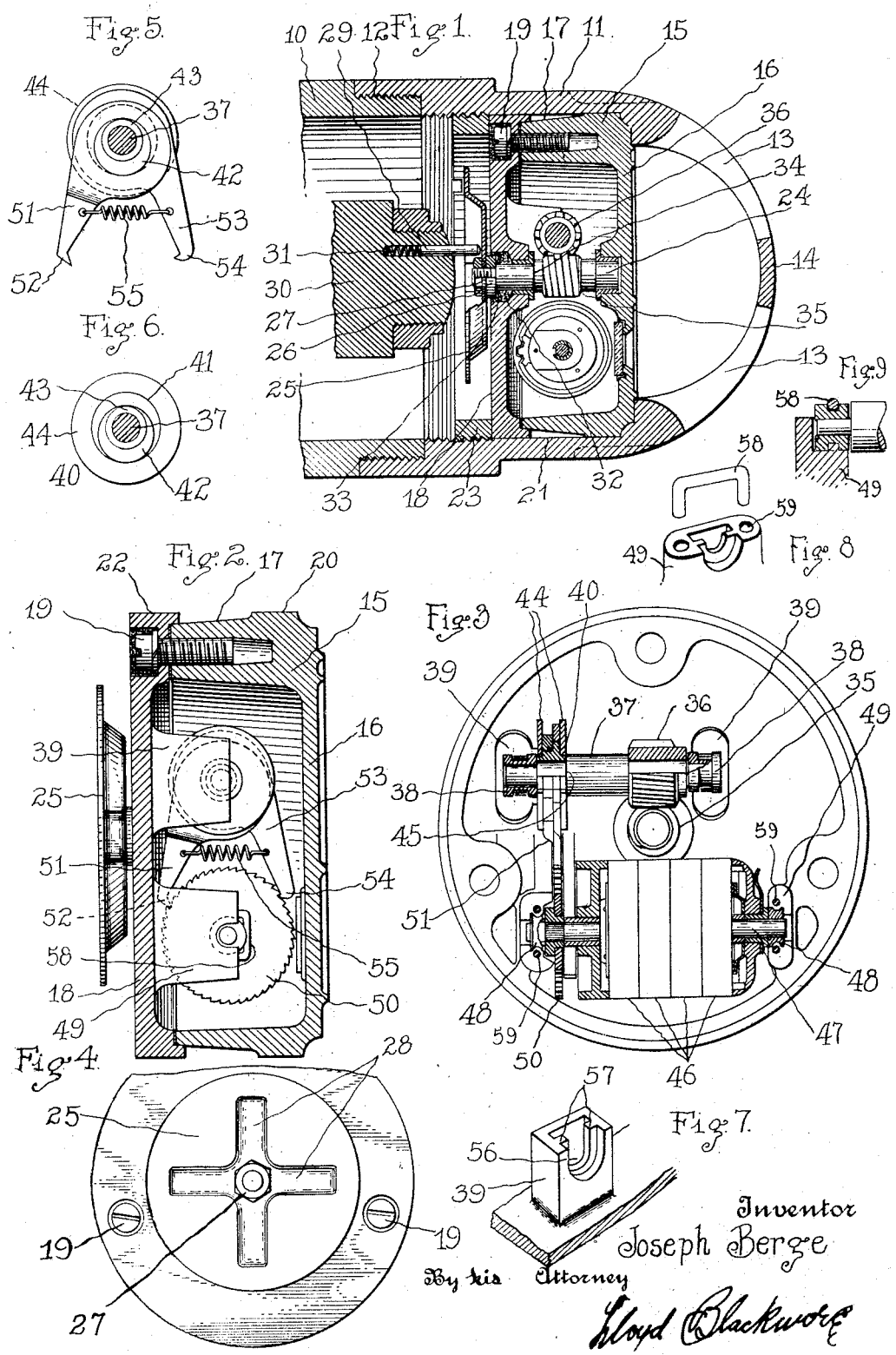
Inventor
Joseph Berge
By his Attorney
Lloyd Blackmore Patented Apr. 1, 1924.

1,488,631

UNITED STATES PATENT OFFICE.

JOSEPH BERGE, OF FLINT, MICHIGAN, ASSIGNOR TO A C SPARK PLUG COMPANY, OF FLINT, MICHIGAN, A CORPORATION OF MICHIGAN.

HUB ODOMETER.

Application filed April 14, 1919. Serial No. 289,829.

*To all whom it may concern:*

Be it known that I, JOSEPH BERGE, a citizen of the United States, and resident of Flint, Genesee County, State of Michigan, have invented certain new and useful Improvements in Hub Odometers, of which the following is a specification.

My invention relates to odometers for registering the distance travelled by motor driven or other vehicles, and particularly to the class or type of odometers commonly referred to as hub odometers, wherein the odometer mechanism is located within a hub cap secured to the end of the hub of a wheel of the vehicle, and is operated from the axle of the vehicle through a suitable driving connection.

One object of my invention is to provide an improved hub odometer wherein an improved construction of hub cap is employed, the odometer mechanism itself being housed within a suitable casing detachable from the cap and secured in place within the same.

A further object of my invention is to provide improved operating means in combination with a hub odometer wherein the odometer mechanism is located within the hub cap, and through which operating means the said mechanism is operated from a wheel of the vehicle.

A further object of my invention is to provide an improved form of casing within which the odometer mechanism is housed, the casing in its entirety being removable from the hub cap within which it is secured when the odometer is in use.

A further object of my invention is to provide improvements in and relating to the construction and arrangement, and to various of the features of the several mechanisms which collectively form the odometer mechanism wherein my invention consists.

With the above and other objects of the invention in view, my invention consists in the improved hub odometer illustrated in the accompanying drawing and hereinafter described and claimed, and in such variations and modifications thereof as will be obvious to those skilled in the art to which my invention relates.

Referring now to the drawing wherein the preferred embodiment of my invention is illustrated:

Figure 1 is a view showing a section of my improved hub odometer mechanism taken upon a vertical central plane, the hub cap within which the same is located being secured to the free end of the hub of the vehicle with which the device is used.

Figure 2 is a view upon a somewhat larger scale showing the odometer mechanism apart from the hub cap, said mechanism being shown in side elevation and the casing in section.

Figure 3 is a view showing the odometer mechanism by itself, the front portion of the casing within which the same is housed being omitted.

Figure 4 is a view showing the driving disc whereby the odometer mechanism is operated.

Figure 5 is a view showing the pawl and ratchet mechanism through which the odometer wheels or discs are operated from the cam shaft of the instrument.

Figure 6 is a view showing the cam member whereby the pawl and ratchet mechanism shown in Figure 5 is operated.

Figure 7 is a view showing a detail of my invention in perspective, and Figures 8 and 9 are views showing a modified form of the detail shown in Figure 7.

Referring to the drawing, the reference numeral 10 designates a portion of the hub of the wheel of a vehicle, and 11 designates a hub cap secured to the element 10 through a screw-threaded connection at 12, so that the cap and odometer mechanism located within the same may be readily removed from the hub should it be deemed desirable to do so. The hub cap 11 is rounded at its outer end and is provided with a plurality of openings 13 through which the front of the odometer casing may be seen, and the reading of the registering wheels thereof ascertained; said openings being separated by a bar 14 to thereby provide protection to the odometer mechanism to as great an extent as possible, while at the same time permitting the same to be readily seen through the openings in the open end of the hub cap in order to read the same.

Located within the hub cap 11 is an odometer casing within which the odometer mechanism is contained, said casing being made up of a cup-shaped casing member 15 having a front wall 16 and a peripheral wall 17, together with a rear cover portion 18 which serves to close the open end of the cup-shaped casing section and is secured thereto by a plurality of screws 19 extending into the peripheral side wall 17. The rear cover portion 18 serves also as a support for the various operating elements or mechanisms of the odometer, said elements being supported in bearings supported by said cover portion as will hereinafter appear.

The cup-shaped casing section 15 is provided with a projecting bearing upon its periphery and arranged near its outer closed end, such projecting portion being illustrated as in the form of an annular rib or flange 20 extending about the section and which flange is adapted to contact with the interior surface 21 of the hub cap to thereby properly hold the forward end of the casing in place within the said cap. The remaining portion of the peripheral wall 17 of the cup-shaped section 15 is reduced in diameter, in order to facilitate the manufacture of the said section by casting operations, and the rear cover portion 18 of the casing is extended somewhat beyond the outer edge of the side wall 17, as shown at 22 in Figure 2, in order that the periphery of the said head may contact with the interior surface 21 of the hub cap; from which it follows that the odometer casing regarded in its entirety is supported within the hub cap by the two spaced bearing surfaces 20 and 22, while the portion of the casing between said bearings does not contact with the interior of the hub cap within which the casing is located. The casing as a whole is secured in place within the hub cap by means of a threaded ring 23 in engagement with threads formed upon the interior thereof, as best shown in Figure 1.

The odometer mechanism as a whole is operated by a main driving shaft 24 the two ends of which are supported, respectively, in bearings provided in the front wall 16 and in the cover 18; and the reference numeral 25 designates a driving disc shown as secured to and carried by a collar 26 fitting against a shoulder provided at the inner end of the shaft 24, the collar and driving disc carried thereby being secured in place by a nut 27 in threaded engagement with the reduced end portion of the said driving shaft. This driving disk 25 is provided with a plurality of grooves or depressions 28, preferably arranged in the form of a cross as shown in Figure 4.

The disc 25 is driven by means of a pin 29 located within a hole provided in the stationary axle 30 of the vehicle and which pin is pressed outwardly by a spring 31. The free outer end of this pin is adapted to enter one or another of the grooves 28 to thereby secure the operation of the odometer mechanism as the same rotates with the wheel of the vehicle; and it will be appreciated that in placing the hub cap with the odometer mechanism therein in place it will be unnecessary to aline the end of the pin with a groove, as the spring 31 will permit the pin to move to the left should its free end contact with the driving disc 25 between the grooves when the hub cap is put in place. Afterwards, and as soon as the odometer mechanism has rotated with the wheel to an extent sufficient to bring a groove opposite the end of the pin, the spring 31 will obviously force the pin into the groove, after which a driving connection will be maintained between the parts and the driving shaft 24 will be properly driven.

The outer end of the drive shaft 24 is covered by a portion of the front wall of the odometer casing, while the inner end thereof extends through a stuffing box containing a yieldable packing 32 of felt or similar material; such packing being held in place by a ring 33 located within the recess in the end wall 18 within which the packing lies and held therein by the collar 26; the driving shaft being provided with a shoulder at 34 which engages with the bearing carried by the end wall 18 to thereby prevent movement of the shaft to the left and keep the same in proper position relative to the casing whereby it is supported.

The main driving shaft 24 is provided with a worm 35, which worm is in mesh with the worm gear 36 carried by a cam shaft 37 extending transversely to the driving shaft 24, and the ends of which are supported in bearings 38 secured in place in recesses provided in the free outer ends of pedestals or supports 39 carried by the end wall 18 of the odometer casing. The supports may be made either oval or elliptical in outline as shown in Figure 3, or they may be square as shown in Figure 7, as the particular shape is immaterial so far as their supporting function is concerned. Secured to the left hand end of the cam shaft 37 is a cam designated in its entirety by the reference numeral 40 and which cam is shown by itself in Figure 6. This cam is provided with a concentric portion 41, with an eccentric cam portion 42, and with concentric shoulders 43 at its two ends designed to support side plates 44 whereby the operating pawls for operating the odometer discs are held in proper position upon and relative to the cam 40. These side plates are held in proper position between a shoulder 45 provided adjacent the left hand end of the cam shaft 37 and the inner face of the pedestal 39, as clearly shown in Figure 3, and are thus prevented from becoming displaced when the device is in use, as will be appreciated.

The reference numeral 46 designates a plurality of odometer wheels or discs having suitable figures upon their periphery, as is usual in odometer mechanisms, said wheels being supported by an odometer shaft 47 the ends of which are in turn supported in bearings 48 located in recesses formed at the outer ends of pedestals or supports 49 extending from the cover plate 18 the same as in the case of the pedestals 39 hereinbefore referred to.

These several odometer discs are operated by a ratchet wheel 50 operatively connected with the first or units disc of the series, motion being communicated from one disc or wheel to the adjacent wheel of the next higher denomination through any suitable carrying mechanism, which, however, is not illustrated in detail herein, as the same forms no part of this present invention.

The ratchet wheel 50 is operated by a pawl 51 having a tooth 52 at one end adapted to engage the teeth of the ratchet wheel, and the other or upper end of which (referring to Figs. 2 and 3) is provided with an opening of such size as to fit over the cam or eccentric portion 42 of the cam member 40; from which it follows that reciprocating motion will be imparted to the pawl 51 by the said cam when the cam shaft 37 is operated, the cam being fast upon and driven by the shaft, as will be appreciated. The reference numeral 53 designates a stationary pawl having a tooth 54 at its lower end designed to prevent backward movement of the ratchet 50, and the upper end of which pawl is provided with a circular opening designed to fit over and be supported by the concentric supporting portion 41 of the cam member 40; from which it follows that this last mentioned pawl is capable of slight oscillatory movement upon the support 41 but is not reciprocated by the said cam member. The pawls 51 and 53 are drawn toward one another by a spring 55 the ends of which are connected with said pawls and whereby the teeth at their lower free ends are kept in engagement with the teeth of the ratchet 50, as will be appreciated.

The construction of the free outer ends of the pedestals or supports 39 whereby the bearings 38 for the cam shaft 37 are supported is best shown in Figure 7 of the drawing, from which figure it will be seen that the free ends of said supports are provided each with a U-shaped recess 56 within which the bearing member 38 is located; and which recesses are preferably provided with ribs 57 which enter into grooves provided in the bearing members, as best shown in Figure 3, to thereby hold the bearing members 38 in proper position within the U-shaped seats provided for their reception. After the bearings are in place within their seats the metal at the upper ends of the U-shaped seats, or at the upper ends of the ribs 57, is swedged, peened, staked or otherwise operated upon by any suitable tool in such a way as to cause a portion of the metal to overlay the bearing member 38 and thereby hold the same in place within the U-shaped seats; it being of course appreciated that all the parts carried by the shaft will be assembled therewith and the bearings 38 then introduced into the seats provided for them, after which the bearings are fastened in place in the manner substantially as above pointed out. This method of construction provides odometer mechanism in which the use of screws for securing the parts in place is avoided, and mechanism which is much less likely to become loose due to the shocks and vibration to which the odometer is subjected when in use than is the case in odometer mechanisms wherein the parts thereof are assembled and held in proper relation one with another by the use of screws.

It will be appreciated that the method above explained for securing the bearing members 38 in place is likewise and in the same way available for securing the bearings 48 wherein the ends of the odometer shaft 47 are supported in place. I have, however, shown these last mentioned bearings as held in place in U-shaped slots provided in the upper ends of the pedestals 49 by means of staples 58, see Figures 9 and 10, the depending sides or legs of which enter holes 59 provided in the upper ends of the pedestals. These staples may be made of spring wire so that they will have a clamping or binding action upon the sides of the holes when they are in place therein; and they permit the parts to be somewhat more readily disassembled, should it become necessary to do so, than the form of securing means hereinbefore described.

In view of the premises it will be appreciated that rotary movement of the main driving shaft 24 will be communicated through the worm gearing 35—36 to the transverse cam shaft 37, and from the said shaft through the pawl and ratchet mechanism made up from the pawls 51, 53 to the ratchet 50 whereby the odometer mechanism is operated; and that the reduction in speed between the driving shaft and the odometer shaft 47 operated by said ratchet mechanism is for the most part accomplished by the worm gearing above referred to, the ratchet and pawl mechanism operating comparatively slowly because of the fact that they are operated by the shaft 37 which itself is driven at a much slower speed than the main driving shaft 36 of the instrument through the reducing worm gearing 35, 36. This arrangement provides a pawl and ratchet transmitting mechanism which is much more durable and reliable in its operation than is the case where such mechanism or its equivalent is operated directly from the main driving shaft of the instrument, or at high speed relative to the mechanism or device which is operated by the transmission mechanism here referred to.

Having thus described and explained my invention, I claim and desire to secure by Letters Patent:

In an odometer of the class described, two supports spaced apart from one another and each of which is provided with a U-shaped open recess at its free end; two bearings located one in each of said recesses; and two staples, one associated with each of said bearings and the sides of which staples enter holes provided in the upper ends of the supports aforesaid and extending substantially at right angles to the axes of said bearings to thereby hold said bearings in place within said recesses.

In testimony whereof I affix my signature.

JOSEPH BERGE.